United States Patent [19]

Mahlmann et al.

[11] Patent Number: 4,501,761

[45] Date of Patent: Feb. 26, 1985

[54] CONTROLLED COFFEE ROASTING

[75] Inventors: James P. Mahlmann, Princeton Junction; Steven M. Schecter, Manalapan, both of N.J.; Lawrence Scher, Bronx, N.Y.

[73] Assignee: General Foods Corporation, White Plains, N.Y.

[21] Appl. No.: 448,546

[22] Filed: Dec. 10, 1982

[51] Int. Cl.$^3$ .................................................. A23F 5/04
[52] U.S. Cl. ....................................... 426/467; 426/595
[58] Field of Search ................ 426/467, 466, 595, 594

[56] References Cited

U.S. PATENT DOCUMENTS

| | | | |
|---|---|---|---|
| 1,991,190 | 2/1935 | Backer et al. | 426/466 |
| 2,278,473 | 4/1942 | Musher | 426/595 |
| 2,348,066 | 5/1944 | Goldfine | 426/467 |
| 2,388,298 | 11/1945 | Stephans | 426/466 |
| 2,443,620 | 6/1948 | Hubbard | 426/466 |
| 2,572,679 | 10/1951 | Torres | 426/466 |
| 3,122,439 | 2/1964 | MacAllister et al. | 426/467 |
| 3,345,180 | 10/1967 | Smith | 426/467 |
| 3,572,235 | 3/1971 | Nutting et al. | 99/470 |
| 3,595,668 | 7/1971 | Nutting et al. | 426/467 |
| 3,964,175 | 6/1976 | Sivetz | 426/467 |

FOREIGN PATENT DOCUMENTS

| | | | |
|---|---|---|---|
| 0544638 | 8/1957 | Canada | 426/467 |

*Primary Examiner*—Raymond Jones
*Assistant Examiner*—Marianne S. Minnick
*Attorney, Agent, or Firm*—Thomas A. Marcoux; Thomas R. Savoie; Daniel J. Donovan

[57] ABSTRACT

A coffee roasting method permitting control of final product properties is disclosed. Gases, usually air and combustion gases, are heated to a temperature selected from the range between 200° C. and about 240° C. A bed of coffee beans is suspended in a bubbling bed by the heated gas and maintained that way for about 2 minutes to about 10 minutes. The roasted coffee beans are subsequently discharged from the bubbling bed and cooled. The density of the roasted coffee beans is determined by the specific roasting conditions selected.

5 Claims, 1 Drawing Figure

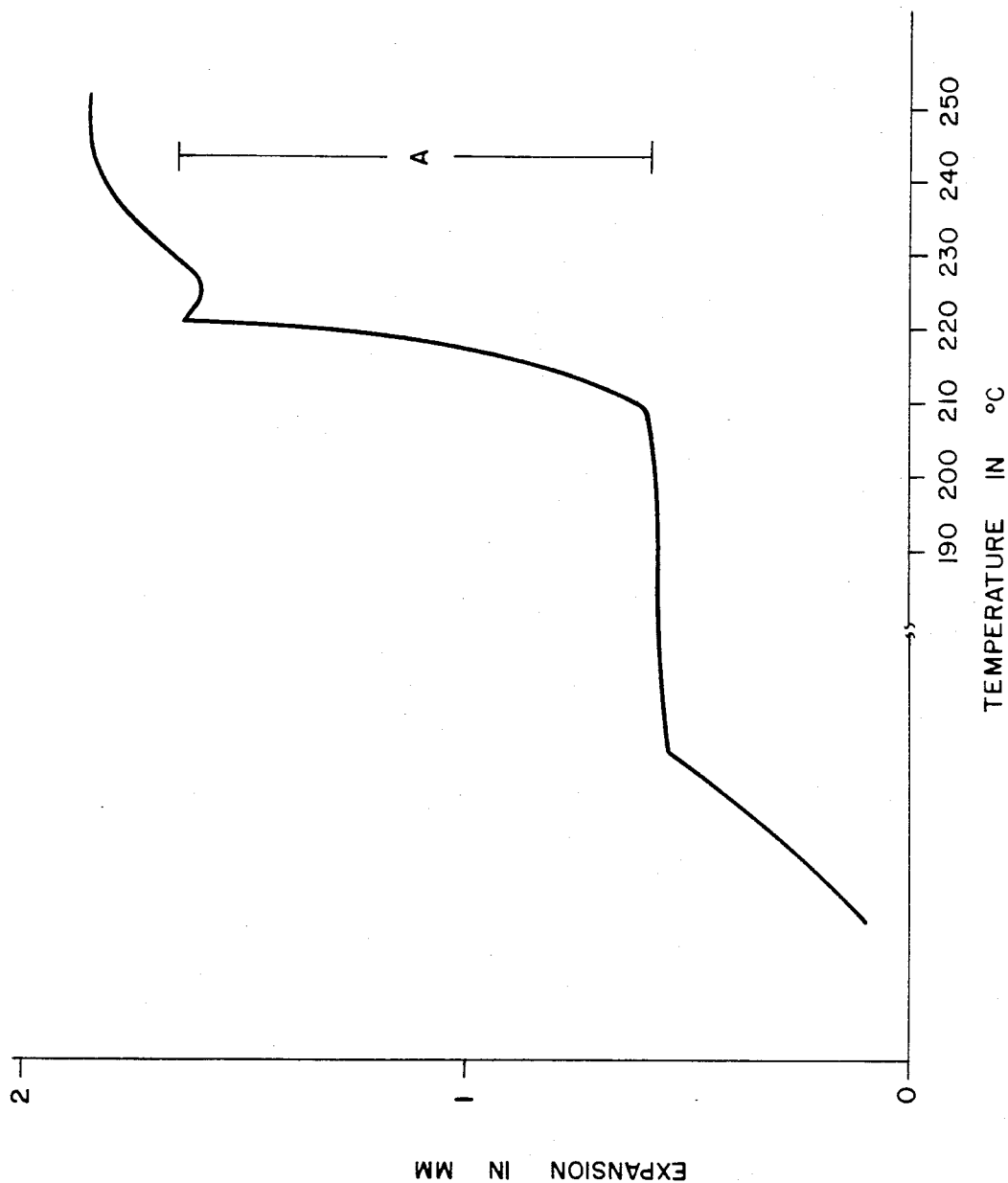

CONTROLLED COFFEE ROASTING

TECHNICAL FIELD

The present invention relates to a coffee roasting method and particularly, to a coffee roasting method permitting control of final product properties.

BACKGROUND ART

Conventional non-fluidized bed coffee roasting equipment uses a roasting atmosphere at a temperature often exceeding 540° C. In addition, conventional non-fluidized bed roasters typically use low weight ratios of roasting atmosphere to coffee beans (hereinafter referred to as the air to bean ratio). The combination of the high roasting temperature and low air to bean ratio results in a temperature gradient from bean to bean as well as within the coffee bean itself. Such a temperature gradient indicates that different roasting reactions occur at different times among the beans as well as internally in any given coffee bean.

Fluidized bed roasting of coffee beans is well established in the art. For example, U.S. Pat. No. 4,169,164 to Hubbard et al. describes a two stage fluidized bed roasting process wherein the temperature in the first stage is between about 226° C. and 243° C. and the temperature in the second stage is between 268° C. and 285° C. A similar, improved process is disclosed in U.S. Pat. No. 4,322,447 to Hubbard wherein the temperature in both stages is between 287° C. and 299° C. although the velocity of the roasting atmosphere is varied between the two stages. The apparatus contemplated for use in both disclosures is a fluidized bed apparatus wherein heated gas is directed downwardly through jets onto a vibrating gas-impervious plate which gas is then deflected upward, thereby fluidizing the roasting coffee beans. The apparatus is more fully described in U.S. Pat. No. 3,229,377 to Hoyt. Numerous modifications of the apparatus are disclosed in U.S. Pat. Nos. 3,262,217, 4,109,394, 4,169,322, 4,201,499 and 4,306,359. Both the Hubbard and Hubbard et al. processes operate for at least a portion of the roast at temperatures well in excess of 240° C. and hence, fail to gain the advantages of the present invention.

Another apparatus for the fluidized bed roasting of coffee at temperatures not in excess of 276° C. is disclosed in U.S. Pat. No. 3,964,175 to Sivetz. Again, by roasting at temperatures as high as 276° C., the Sivetz apparatus does not offer the unique advantages of the present invention. The Sivetz disclosure also contains an extensive survey of the prior art attempts at fluidized bed roasting. The processes described therein are unlike the present invention.

It is an object of the present invention to provide a coffee roasting method which permits better control of the final product properties.

It is another object of the invention to provide a roasting method which provides greater control over the roasted whole bean density.

It is another object of the invention to provide a roasting method to produce a less dense coffee having flavor strength and soluble solids yield equal or better than that of a denser conventionally roasted coffee.

It is a further object of the present invention to provide a roasting method with greater process control, owing to the lower roasting temperatures used therein.

BRIEF DESCRIPTION OF THE DRAWING

FIG. 1 is a representational plot of the results obtained by individually roasting a number of coffee beans in a thermomechanical analyzer. The figure indicates the expansion of the coffee bean as a function of the bean temperature during roasting.

DETAILED DISCLOSURE OF THE INVENTION

It has now been found that the objects of the invention are met by a coffee roasting method using a single roasting atmosphere temperature at or less than about 240° C. throughout the entire roasting cycle wherein coffee beans are suspended in a bubbling bed in a gas heated to a temperature selected from the range between 200° C. and about 240° C. and maintained that way for from 2 minutes to 10 minutes. The roasted coffee beans are then discharged and cooled.

A key feature of the present invention is controlling the temperature to which the roasting coffee is exposed to a temperature selected from the range between 200° C. and about 240° C. It is known that the so-called pyrolysis reactions, those reactions responsible for the characteristic coffee flavor, aroma and color, begin to occur only at temperatures in excess of about 185° C. as described in *Coffee Processing Technology*, Sivetz and Foote, Westport, Conn., AVI Publishing, Vol. 1 p. 230, (1963). Exposing coffee beans to temperatures in excess of about 240° C. leads to surface charring or burning of the beans, increasing roasting losses and impairing the flavor of the coffee so roasted. By limiting the temperature of the roasting atmosphere to one selected from the range between 200° C. and about 240° C. in the present method, the coffee beans are heated to a temperature sufficiently high so as to induce pyrolysis but low enough to avoid damaging the beans, thereby providing a superior roasted coffee.

It has also been found that flavor and color development reactions occur uniformly among the beans and within each coffee bean if the roasting atmosphere is maintained at a temperature at or below about 240° C. Structural stresses within the coffee beans are reduced, permitting greater control over roasted whole bean density. The desired temperature uniformity as well as rapid heat transfer rate are achieved by suspending the coffee beans in a bubbling bed with a constant temperature roasting atmosphere maintained below about 240° C.

Maintaining the roasting atmosphere within the prescribed range is also essential for the reason that it is within said range that the so-called glass transition temperature, $T_g$, is reached. The glass transition temperature, as defined in polymer chemistry is that temperature at which a polymer loses its crystalline structure, softens and becomes amorphous, like glass. A coffee bean is known to be comprised of a large portion of crystalline carbohydrates, such as mannan and cellulose. When $T_g$ is reached, the carbohydrates contained in said beans soften and lose the crystalline structure. Internal pressure produced by gases generated during roasting causes the softened mannan and cellulose within the bean to expand, "opening up" the bean to roasting and providing the density decrease that is an object of the present invention.

The phenomena of a coffee bean passing through its glass transition temperature is observed from FIG. 1. FIG. 1 is a representative plot of the typical results obtained from roasting coffee beans in a thermomechanical analyzer. Such a thermomechanical analyzer measures the expansion or contraction of a material about a given axis in response to a controlled heat input. Thermomechanical analyzers are often used in the polymer industry to determine Tg, which is indicated by the changed slope of the expansion curve measuring the expansion about a given axis. As Tg is reached, the polymer (in this case, mannan and cellulose) softens and the internal pressure causes the markedly different, nearly vertical, rate of expension observable on the expansion curve. In FIG. 1, the representative shape of which was obtained by roasting coffee beans individually in a Perkin-Elmer Thermomechanical Analysis System 4, Tg is seen to occur between about 210° C. and 225° C. as indicated by the changed slope of the curve in the region marked "A".

The roasting atmosphere temperature is not limited to within the range of 200° C. to 240° C. in conventional roasting and in fact, said temperature is deliberately chosen to be substantially higher than 240° C. "Conventional roasting" refers to roasting in typically commercial equipment, such as a Thermalo roaster manufactured by Jabez Burns & Sons, Inc., wherein relatively low velocity roasting atmosphere contacts an essentially static bed of the coffee beans at inlet temperatures of between 370° C. and 560° C. The roasting atmosphere temperature is often modulated to within the range of 340° C. to 530° C. toward the end of the roast. Flame time, that is, the amount of time the hot roasting atmosphere is actually circulated through the roaster, is usually 10 to 12 minutes, with the total roasting cycle taking about 15 to about 17 minutes. A faster conventional roasting technique is disclosed in U.S. Pat. No. 4,349,573 to Stefanucci et al. wherein the roasting atmosphere temperature is increased to about 640° C. with a modulation temperature between 365° C. and 520° C. The flame time is correspondingly reduced to between 5 and 7.5 minutes. It is emphasized that conventional roasting uses an essentially static bed, heat transfer to which is relatively slow and non-uniform.

Roasting within the prescribed temperature range of 200° C. to 240° C. affords greater control over the roast color of the coffee in comparison to conventional roasting. In conventional roasting, the temperature of the roasting coffee beans is constantly increasing, without ever reaching or indeed, closely approaching the roasting atmosphere temperature hereinbefore described. Thus, the rate of the roasting reaction is constantly accelerating, making the point at which the roast is terminated critical, for if the roast proceeds even 10 seconds longer than targeted for instance, the roasted coffee will be significantly darker than desired. In the roasting method of the present invention, the temperature of the coffee beans rapidly approaches the temperature of the roasting atmosphere so that the rate of the roasting reaction is fairly steady. A relatively small variation in the roast time will not cause the roasted coffee to be significantly darker, particularly when a roasting atmosphere temperature toward the lower end of the specified range is used.

Another important feature of the present invention is roasting in a bubbling bed, which bubbling bed promotes rapid and uniform heat transfer from the roasting atmosphere to the roasting coffee beans. A "bubbling bed" is intermediate between a static, non-fluidized bed wherein essentially none of the beans are suspended in the roasting atmosphere and a fluidized bed wherein substantially all of the beans are suspended in the roasting atmosphere. Bubbling bed as used herein is one in which the greater mass of coffee beans is suspended in the roasting atmosphere at any given time, with a smaller mass of beans comprising a static bed. There is constant circulation within the bubbling bed, with any given coffee bean being suspended for between about 50% and 70% of the time. The rapid heat transfer promoted in a bubbling bed causes the temperature of the beans to closely approach that of the roasting atmosphere, minimizing the thermal gradient between said beans and roasting atmosphere. It has been discovered that a minimal thermal gradient is desirable in furthering uniformity among the roasting coffee beans as well as minimizing structural stresses in the bean, permitting optimal bean expansion (and hence, an optimal roasted whole bean density decrease).

The bubbling bed is formed by suspending the greater mass of coffee beans in a large volume of upwardly flowing roasting atmosphere. One difference between conventional static bed roasting and bubbling bed roasting is shown by the weight ratio of roasting atmosphere to coffee beans, the so-called air to bean ratio. In a typical conventional commercial coffee roaster, the air to bean ratio is about 1.0 kg air (roasting atmosphere)/1.0 kg roasting coffee beans. The air to bean ratio of the present method though, is preferably from 40.0 to 150.0 kg air/1.0 kg coffee beans. With the high air to bean ratio, the individual coffee beans are surrounded by an "envelope" of roasting atmosphere, contributing to the uniformity of the roasted coffee. The air to bean ratio for a fluidized bed is between 10.0 and 30.0 kg air/1.0 kg coffee beans. The inlet velocity of the roasting atmosphere needed to maintain a bubbling bed is also intermediate between the velocity in a conventional roaster and the roasting atmosphere velocity in a fluidized bed roaster. In a bubbling bed roaster, the velocity is on the order of 670 m/min to 1250 m/min compared to between 40 m/min and 46 m/min for a conventional roaster and on the order of 3660 m/min for fluidized bed roasting. As is apparent, the maintenance of the bubbling bed as compared to a fluidized bed differs primarily in the inlet velocity of the roasting atmosphere.

The heated gas or roasting atmosphere which is used to suspend and maintain the bubbling bed may be indirectly heated air or preferably, air combined with the combustion gases (principally carbon dioxide and water) of the heat source, typically a burner. Combining the air with the combustion gases is preferred because of the greater efficiency of such an arrangement. Additional energy efficiency is achieved by recirculating a majority of the roasting atmosphere throughout the roasting cycle. Recirculation is particularly convenient in the present invention because the lower temperature used herein eliminates the surface burning of the coffee beans and hence, smoke formation associated with conventional roasting.

Manipulation of the roasting atmosphere temperature within the prescribed range, as well as of the roasting time between about 2 minutes and 10 minutes provides sufficient control so as to produce roasted coffees with varying properties. Table 1 illustrates the different roasted whole bean densities attainable (at nearly constant roast color) by varying the roasting temperature and time. The roasted whole bean density is seen to decrease steadily with increasing temperatures and correspondingly shorter roasting times. Table 2 illustrates the different roasted whole bean densities attainable by varying the roasting time at constant roasting temperature. Roasted whole bean density is seen to decline with increasing roasting time. In addition, it is seen that the density of the coffee produced by the present method may be made either greater or lower than that obtainable by conventional coffee roasting (densities between about 0.30 gm/cc and 0.50 gm/cc for the method of the present invention compared to about 0.32 gm/cc for conventional roasting).

Such improved density control is a significant advantage of the present invention, greatly expanding the variety of roasted coffee products that may be produced. For example, the ability to produce a higher density product is useful in soluble coffee processing because a greater weight of said coffee can be loaded in an existing percolator column, increasing productivity. The ability to produce a lower density coffee provides a product which product permits using a lesser weight of coffee to give the same cup strength and as much or more aromatic coffee flavor.

equal volume of a more typically dense conventionally roasted coffee. The consumer realizes a cost savings in using less coffee without altering the customary recipe level.

Although a lesser weight of the lower density coffee may be used, a brew prepared from said coffee is as strong as a brew prepared from a greater amount of a conventionally roasted coffee. Table 3 shows that both the soluble solids and the flavor strength (perceived by an expert panel) are greater for a coffee produced by the present invention as compared to a conventionally roasted coffee. The roasted coffee prepared by the method of the present invention was roasted in a bubbling bed at a temperature of 232° C. for about 2.5 minutes. The conventionally roasted coffees were roasted in a commercial unit wherein heated air is blown through a perforated rotating cylinder containing the coffee beans to conductively heat the cylinder and convectively heat the beans. The inlet air temperature was between about 370° C. and 560° C. for 10 minutes for

TABLE I

| Bean Strain | Roaster | Roasting Temperatures (°C.) | Roasting Time | Final Roast Color | Roasted Whole Bean Density (gm/cc) | % Decrease From Green Bean Density |
|---|---|---|---|---|---|---|
| Colombian Milds | bubbling bed | 200 | 7 min. 30 sec. | 55 | .404 | 37 |
| | | 220 | 3 min. 15 sec. | 54 | .358 | 44 |
| | | 240 | 2 min. | 54 | .330 | 49 |
| | conventional | 560 | 10 min. | 50 | .389 | 41 |
| | | 640 | 5 min. | 54 | .350 | 47 |
| Brazil Arabicas | bubbling bed | 200 | 8 min. | 58 | .353 | 46 |
| | | 220 | 2 min. 55 sec. | 60 | .322 | 51 |
| | | 240 | 1 min. 40 sec. | 59 | .309 | 53 |
| | conventional | 560 | 10 min. | 63 | .348 | 47 |
| | | 640 | 5 min. | 63 | .320 | 51 |
| Robustas | bubbling bed | 200 | 9 min. 25 sec. | 83 | .363 | 43 |
| | | 220 | 3 min. | 85 | .358 | 43 |
| | | 240 | 1 min. 40 sec. | 83 | .337 | 47 |
| | conventional | 560 | 10 min. | 82 | .416 | 34 |
| | | 640 | 5 min. | 82 | .382 | 40 |

TABLE 2

| Bean Strain | Roasting Temperature °C. | Roasting Time | Final Roast Color | Roasted Whole Bean Density gm/cc |
|---|---|---|---|---|
| Colombian Milds | 220 | 1 minute | >100 | .534 |
| | | 2 | 97 | .382 |
| | | 3 | 57 | .351 |
| | | 4 | 44 | .338 |
| | 240 | .5 minute | >100 | .571 |
| | | 1 | >100 | .446 |
| | | 1.5 | 85 | .347 |
| | | 2 | 52 | .324 |
| | | 3 | 26 | .299 |
| Brazil Arabicas | 220 | 1 minute | >100 | .386 |
| | | 2 | 97 | .321 |
| | | 3 | 63 | .311 |
| | | 4 | 48 | .301 |
| | 240 | .5 minute | >100 | .430 |
| | | 1 | >100 | .334 |
| | | 1.5 | 78 | .307 |
| | | 2 | 42 | .282 |
| | | 3 | 27 | .276 |
| Robustas | 220 | 1 minute | >100 | .498 |
| | | 2 | >100 | .380 |
| | | 3 | 82 | .344 |
| | | 4 | 64 | .338 |
| | 240 | .5 minute | >100 | .451 |
| | | 1 | >100 | .367 |
| | | 1.5 | 88 | .330 |
| | | 2 | 65 | .325 |
| | | 3 | 33 | .315 |

The lower density of the product enables the consumer to use the same volume of coffee in the preparation of said coffee, which volume of coffee weighs less than an the slow conventional roast and at a temperature of approximately 640° C. for 5 minutes for the fast conventional roast.

TABLE 3

| Roasted Coffee | Roast Color | Recipe cups/lb | % Soluble Solids | Perceived Strength Scale of 5–10 |
|---|---|---|---|---|
| Milds | | | | |
| bubbling bed | 54 | 90 | 23.9 | 5.9 |
| conventional (fast) | 48 | 90 | 19.5 | 5.3 |
| conventional (slow) | 52 | 75 | 21.3 | 5.0 |
| Brazils | | | | |
| bubbling bed | 63 | 90 | 25.1 | 6.1 |
| conventional (fast) | 62 | 90 | 24.4 | 5.7 |
| conventional (slow) | 63 | 75 | 21.5 | 5.0 |
| Robustas | | | | |
| bubbling bed | 83 | 90 | 23.0 | 5.2 |
| conventional (fast) | 82 | 90 | 23.0 | 5.3 |
| conventional (slow) | 82 | 75 | 18.6 | 5.0 |

The brew prepared at 75 cups/lb. was made with 63.4 gm. coffee/1780 ml. water and the brew prepared at 90 cups/lb. was made with 51.2 gm. coffee/1780 ml. water. Perceived strength of the brew is based on a scale of 5 to 10 with the slow conventionally roasted coffee being assigned a base value of 5 in each case.

The roasting method of the present invention may be either batch-wise or continuous. In a batchwise scheme, the green coffee beans are loaded into the roaster. The roasting atmosphere is then heated to a temperature within the specified range between 200° C. and about 240° C. and circulated upwardly through the bed of coffee beans at a velocity between 670 m/min and 1250 m/min in order to create the bubbling bed. The air to bean ratio is between 40.0 and 150.0 kg air/1.0 kg coffee beans. After the beans have been roasted for a sufficient period of time, the circulation of the roasting atmosphere is halted. The roasted coffee beans may then be rapidly cooled to a temperature below 65° C. by either chilled air or water quenching.

A continuous roasting method is preferred because of the relative ease of operation and greater uniformity obtainable with a continuous method. The preferred scheme is one in which the green coffee beans are continuously fed to a rotating perforated cylinder contained in the roasting apparatus. The cylinder is compartmentalized by a helical screw contained therein. As the cylinder rotates, the coffee beans are moved forward from one compartment to the next by said rotating helical screw. The beans charged to one compartment remain separated from the others, preventing any mixing of the coffee beans at different degrees of roast. Such separation insures that essentially all of the coffee beans have the same residence time within the roaster, which residence time is controlled by the rate of rotation of the perforated cylinder. The roasting atmosphere, preferably comprised of the combustion gases of the heat source, is forced upwardly along the whole length of the perforated cylinder with sufficient force and at a sufficient volume to create bubbling beds of the beans contained in each compartment. Thus, the air to bean ratio and inlet roasting atmosphere velocity are most preferably as described for the batch bubbling bed roaster. The rotating action of the perforated cylinder provides further advantageous agitation within the bubbling beds, in addition to the provided by the upwardly flowing roasting atmosphere. The roasted coffee beans are discharged from the apparatus and preferably cooled to a temperature below 65° C. by air or water quenching.

The continuous bubbling bed roasting method of this invention is preferable to a fluidized roasting process wherein the beans are fluidized by impinging a gas on a gas impervious plate such as is disclosed in U.S. Pat. No. 4,169,164 to Hubbard et al. or U.S. Pat. No. 4,322,447 to Hubbard. The fluidized bed roasting method makes no provision for preventing back-mixing within the fluidized coffee bed. Consequently, coffee beans charged to the roaster at the same time do not necessarily have the same retention time therein, with some beans exiting sooner and others exiting later than those charged at the same time. The result is, of course, lessened uniformity of the roasted coffee. The continuous bubbling bed method though, uses the helical screw which in effect compartmentalizes the roaster, insuring the uniformity of the retention time of coffee beans charged at a given time. Such uniformity of retention time leads to desirable uniformity of the roasted coffee so produced.

The following examples illustrate certain embodiments of the present invention. The examples are not intended to limit the invention beyond what is claimed below.

EXAMPLE 1

1. 454 gm of green Colombian Mild coffee having about 10% by weight moisture were placed in a "V" shaped perforated basket and placed in a batch Ross Dryer manufactured by Midland-Ross Co. of New Brunswick, N.J.

2. The coffee beans were then roasted at 232° C. with a roasting atmosphere velocity of 1220 m/min which flow rate was sufficient to suspend the beans in a bubbling bed. The air-to-bean ratio was about 52 kg air/kg bean.

3. The roast was terminated after 2 min. 45 sec. by shutting off the burner and removing the basket from the Ross Dryer.

4. The roasted beans were rapidly cooled by a forced flow of air at ambient temperature. The results for the roast are shown below.

roast color: 50 color units
roasted whole bean density: 0.332 gm/cm$^3$

The roast color was determined by grinding a sample of the coffee, screening out the fine fraction and compressing the same in a Carver Press to form a tablet and determining the light reflected from said tablet in relation to an arbitrary standard as measured by a Photovolt detector. The method of measuring roast color is fully described in *Coffee Processing Technology*, Sivetz and Foote, Westport, Conn, AVI Publishing, Vol. 2 pp. 132–137.

The roasted whole bean density was determined by the so-called free flow method wherein roasted whole coffee beans are poured through a funnel into a vessel of known volume. The vessel and coffee are weighed, the vessel tare weight subtracted and the density calculated therefrom.

The roasted coffee was then ground and a brew prepared therefrom. The brew was characterized by an expert panel as being woody, aromatic and acid, with a strong cup strength.

EXAMPLE 2

1. Green Colombian Mild coffee beans were fed to a Ross Helical Suspended Particle Dryer (HSP) also manufactured by Midland-Ross, Co. The Helical Suspended Particle Dryer is one wherein the beans are fed to a perforated rotating cylinder having a helical screw therein. The rotating screw advances the green coffee therethrough. The roasting atmosphere, a combination of the burner combustion gases and hot air, is blown upwardly along the bottom length of the cylinder at a rate sufficient to suspend the beans in a bubbling bed. The cylinder used for this example had a 41% open area with 3/32" diameter holes on 9/64" centers.

2. The coffee beans were fed to the HSP at a rate of 16 kg/hr. The perforated cylinder was rotating at a rate of 3 RPM giving a roast time of 2 min. 30 sec. The inlet roasting atmosphere was at 238° C. and was blown through the bubbling bed at a velocity of about 1000 m/min.

3. The beans were rapidly cooled by a forced flow of ambient air after being discharged from the HSP. The results for the roast are shown below.

roast color: 46 color units
roasted whole bean density: 0.321 gm/cm$^3$

The roasted coffee was then ground and a brew prepared therefrom. As in Example 1, the brew was characterized by an expert panel as being woody, aromatic and acid, with a strong cup strength.

What is claimed is:

1. A continuous coffee roasting method comprising:
   (a) continuously charging green coffee beans to the first end of a rotating perforated cylinder, which cylinder is divided into compartments by a helical screw spanning the length of said cylinder;

(b) rotating the perforated cylinder and screw contained therein to advance the coffee completely therethrough in between 2 minutes and 10 minutes;

(c) simultaneously blowing heated gas at a temperature selected from the range between 200° C. and 240° C. upward through the cylinder, along the entire length of said cylinder at a velocity of between 670 m/min and 1250 m/min and at a weight ratio of from about 40/1 to 150/1 said gas to coffee so that the coffee is maintained in a bubbling bed in each said compartment, the temperature of the coffee beans rapidly approaching the temperature of the roasting temperature and being maintained thereat for a combined period of between 2 to 10 minutes until the desired roast is obtained, the bubbling bed condition being intermediate between a static non-fluidized bed where essentially none of the beans are surrounded by the roasting atmosphere and a fluidized bed wherein substantially all of the beans are suspended in the roasting atmosphere, said bubbling bed being one in which the greater mass of coffee beans is suspended in the roasting atmosphere at any given time and a smaller mass of the beans constitute the static bed, whereby heat transfer is promoted causing the bean temperature to closely approach that of the roasting atmosphere; and (d) continuously withdrawing roasted coffee from the second end of said rotating cylinder.

2. The coffee roasting method of claim 1 wherein the roasted whole bean density of the roasted coffee beans is from 0.30 gm/cc to about 0.50 gm/cc.

3. The coffee roasting method of claim 1 wherein the heated gas comprises heated air and the heated combustion gases of a burner.

4. The coffee roasting method of claim 1 wherein the coffee beans are suspended in bubbling bed at a weight ratio of between 45/1 to 55/1 heated gas to coffee.

5. The coffee roasting method of claim 1 which further comprises cooling the beans to a temperature below 65° C. after discharging the beans from the roasting apparatus.

* * * * *